July 28, 1970     R. E. SMITH     3,522,025
APPARATUS FOR PRODUCTION OF THERMOPLASTIC MATERIALS
Original Filed June 1, 1965     2 Sheets-Sheet 1
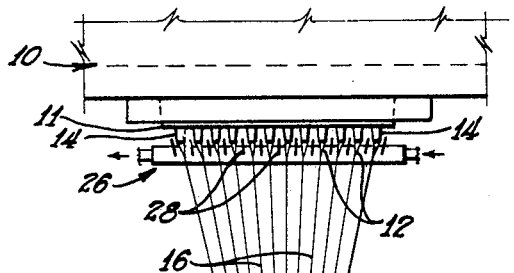
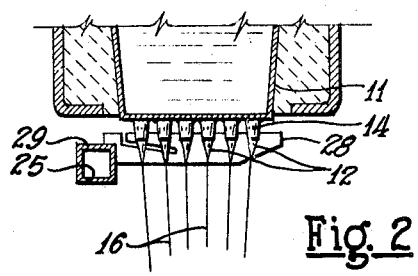
Fig. 2
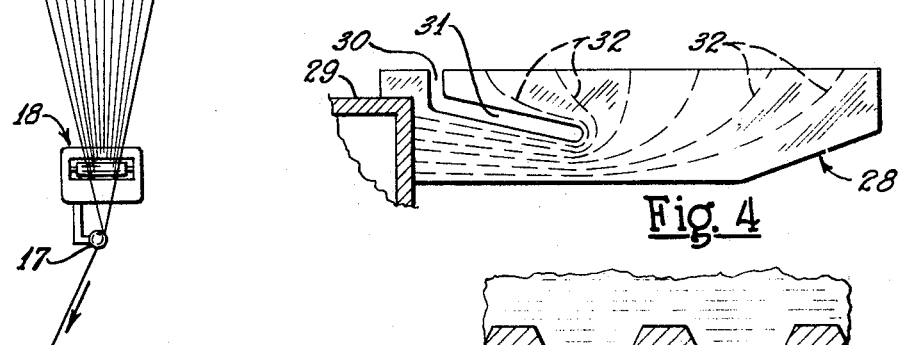
Fig. 4
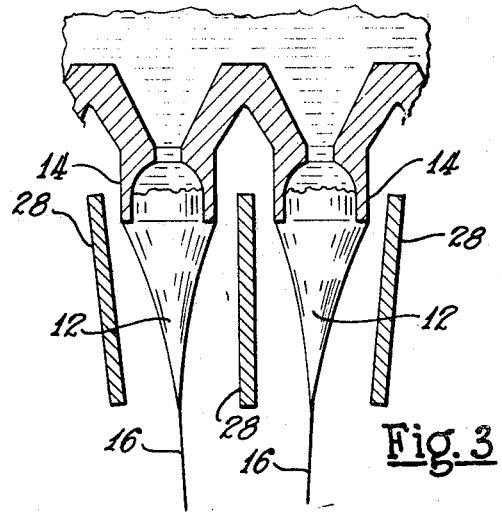
Fig. 3
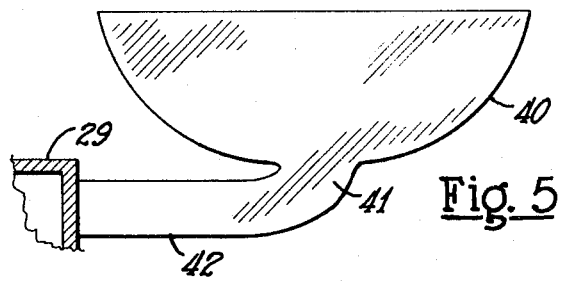
Fig. 5
Fig. 1
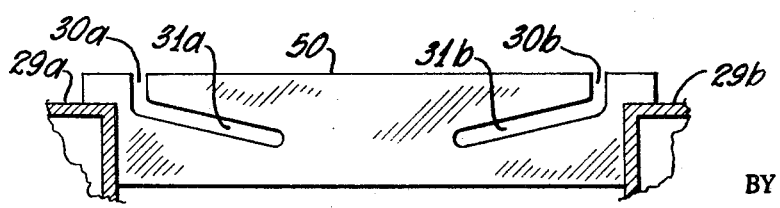
Fig. 6
INVENTOR.
ROY E. SMITH
BY
ATTORNEYS

INVENTOR.
ROY E. SMITH
BY
ATTORNEYS

United States Patent Office 3,522,025
Patented July 28, 1970

3,522,025
APPARATUS FOR PRODUCTION OF
THERMOPLASTIC MATERIALS
Roy E. Smith, Anderson, S.C., assignor to Owens-Corning
Fiberglas Corporation, a corporation of Delaware
Continuation of application Ser. No. 460,071, June 1,
1965. This application Dec. 29, 1967, Ser. No. 694,757
Int. Cl. C03b 37/10
U.S. Cl. 65—12                                    14 Claims

ABSTRACT OF THE DISCLOSURE

A method of and apparatus for maintaining a substantially uniform temperature environment adjacent a plurality of heat sources such as fiber forming cones beneath a molten glass feeder wherein heat absorbing means is disposed adjacent to each stream or cone to conduct heat away from the stream to a heat sink. The resistance of the heat resistance path from an area adjacent the stream to the area of the heat sink may be dimensionally controlled by lengthening or shortening the heat resistance path or making the material wider or thinner along the path so that the temperature environment adjacent each heat source is substantially the same.

This application is a continuation of application Ser. No. 460,071, filed June 1, 1965, now abandoned.

This invention relates to improvements in the production of fibers from thermoplastic or heat-softened materials and particularly to a more stable continuous method and apparatus for producing fibers of siliceous materials such as glass or the like which simultaneously effects an increase in quality, economy and ease of handling such fibers.

The invention is described particularly in connection with the production of continuous glass fibers wherein streams of molten glass are attenuated mechanically into continuous fibers of a small diameter which are then gathered into a strand and wound into a package. Fibers thus produced are then usually processed into other textile forms such as yarns, cords, roving, etc. on conventional textile machinery for subsequent use in ever-widening fields of application.

In greater detail, the process of producing continuous fibers of glass to which the present invention relates involves flowing streams of molten glass from orifices of an electrically heated bushing or feeder associated with a container reservoir in which the material is reduced to a molten condition. The orifices are preferably formed in projecting tips or nipples from which heat of the glass is dissipated as it flows in the form of streams therefrom, but may also be formed in the apex of a V-shaped feeder or other structural arrangement such as a flat-plate feeder made of nonwetting alloy. Upon emission to the atmosphere, the streams of glass each neck down, as determined by their viscosity and surface tension, to form a cone-like body of the glass from the tip of which a fiber is drawn. Tests indicate that the cohesive forces which transmit the attenuation forces from the fiber to the body of the cone are closely related to the viscosity of the glass. Surface tension of the glass also contributes to the transfer of forces over the periphery of the cone, but, in addition, acts to bring about constriction of the streams into the conical configuration. Low viscosity fluids, such as glass at too high a temperature, may actually be constricted into beads by the surface tension, or in other words, divided into a series of droplets instead of flowing as a continuous stream. High viscosity of fluid, on the other hand, slows the constricting forces and does so with much more pronounced effect as the diameter is diminished, thereby causing viscosity to act as a major factor determining stability in the fiber-forming zone.

Taking these facts into consideration, it can be seen that if the viscosity of a given glass emitted from an orifice to a forming cone is too high, the tension required to be applied to the cool fibers to effect attenuation of the cone can be so high as to result in breakage of the fiber. At the more fluid end of the viscosity range, however, the glass flows more freely and the balance surface tension becomes somewhat indefinite which causes a form of pumping action or dancing movement of the cone at the feeder tips. A further lowering of the viscosity of the glass results in an approach towards constriction by the surface tension to the extent that discontinuous separate droplets of the fluid are formed.

A range of viscosities therefore exists within which fiberization of the glass can be accomplished but above and below which fibers are difficult or impossible to produce.

Apparatus has been introduced to the art by way of reissue Pat. No. Re. 24,060, issued Sept. 6, 1955; Pat. No. 2,908,036, issued on Oct. 13, 1959; and Pat. No. 3,150,946, isued on Sept. 29, 1964, in which water-cooled shield members are disclosed for disposition immediately adjacent the fiber-forming cones in noncontacting relation with the feeder to absorb heat from the cones by way of radiation absorption and to divide the total number of tips and the respective cones into smaller groups. The shield members shield the environment of the tips and the fiber-forming cones emitted therefrom against extraneous turbulences of the atmosphere outside the zone of fiber formation. The presence of such cooled shield members have made it possible to extend the viscosity range to permit fiberization of glass heated to a higher temperature than could otherwise be fiberized with fluid emitted in an unshielded fiber-forming zone. The fact that the melt can thereby be raised to a high temperature also permits production of fibers of greater uniformity and permits fiberization of glasses which previously were not fiberizable while at the same time making operation conditions less critical to temperature variations due to turbulences in the surrounding atmosphere. By the provision of cooled shield members in the zone of fiber formation, the rate of cooling of the glass emitted from the feeder is not left to the variant conditions of the atmosphere but provides a greater control of the rate of cooling and makes the conditions of fiber formation more certain.

An additional feature which resulted from the adoption of shield members for fiber-forming operations was the increase in number of rows of tips in a given feeder from which fibers could be attenuated. Previously the number of rows in a given feeder were limited to adjacent rows because if an additional third row were included in the feeder the center row would be so high in temperature from energy radiated to the center row of tips from the outside rows that the glass emitted therefrom would be so fluid as not to allow stable formation of fibers. With the presence of the shield members, however, the number of rows could be increased to many more and at the present time six and eight rows of tips in a given feeder have become somewhat of a standard in the art. The increased number of rows are highly desirable because the length of the feeder can be greatly reduced for a given number of fibers to be produced correspondingly reducing the amount of precious metal such as platinum which is usually used in glass-fiber feeder constructions. Alternatively, the increased number of rows may be highly desirable since a feeder of the same length with an increased number of rows can be utilized to greatly increase the yield from a single forming station.

While the shield members discussed above greatly improve the efficiency of operation and the quality of the product, it has been found that temperature differentials may exist along the length of the fin shields or shield members under operating conditions which range up to 250° F. Thus, the cooling function of the fin is not uniform across the width of the bushings with which they are associated. Therefore, it can be seen from the discussion above that if the variation in the temperature of the fin shield is in the amount indicated by tests that the diameter uniformity of the fibers drawn in a single row is impaired. While this diameter uniformity was not as critical in the past with a larger diameter fiber being drawn, the developments which have enabled the production of fibers of very small diameters have increased the concern with the diameter uniformity. That is, if the range of diameters above and below a given diameter can be reduced the desired diameter to be produced can be reduced in size toward the cutoff point below which present conditions in the art determine that fibers cannot be produced. Further, by reducing the range of diameters about a predetermined desired diameter the fuzzing or breaking of filaments can be reduced and the skin irritation factor is reduced, which is most important since the smallest of the diameters producible are more readily utilizable in clothing which may be or is in contact with the skin.

It is therefore an object of the present invention to provide an improved method and means for producing fibers from thermoplastic materials.

Another object of the present invention is to provide an improved method and means for forming fibers from heat-softenable materials in which more uniform diameters may be obtained with the attendant advantages associated therewith.

It is another object of the present invention to provide a method and means for the production of continuous fibers of glass wherein fin shield members of a particular configuration are utilized for stabilization of the fiber-forming operation to enable the production of fibers having a more uniform diameter.

The invention features the method of forming filaments of thermoplastic material with substantially uniform diameters comprising steps of flowing streams of such materials from feeder orifices, attenuating the streams into fine filaments, and maintaining a substantially uniform temperature environment adjacent the streams by providing substantially equal heat conduction resistance paths from an area adjacent each stream to a heat remover means.

The invention further features apparatus for producing filaments of thermoplastic material comprising a feeder having orifices issuing molten streams of such material, means for attenuating said streams into fine filaments, and environmental control means associated with the feeder. The environmental control means includes heat sink means and a series of fin-like members disposed in heat-transfer relationship with the heat sink means. Each fin-like member is preferably oriented transverse to and in heat-transfer relationship with the paths of at least two of the streams without touching the streams. The members have a configuration which define substantially equal heat conduction paths from maximum temperature areas of the members adjacent the streams to the heat sink means. In a preferred embodiment the fin-like member may have slot means formed therein to create heat conduction resistance areas thereby defining heat conduction paths to the heat sink means. In another embodiment the fin-like member may have material such as stainless steel, disposed in a slot means formed as described above, which has a low coefficient of thermoconductivity with respect to the thermal conductivity of the remainder of the member. In yet another embodiment the fin-like member may have a substantially parabolic configuration with heat-transfer means connecting an apex of the parabolic member to the heat sink means. The heat sink means may comprise at least two separate heat sinks which are disposed in heat-transfer relation with the opposite ends of at least one of the fin-like members. The feeder may be generally circular in shape with orifices aligned in radial rows and the fin-like members radially oriented in their transverse positions.

Other objects, features and advantages will become readily apparent when the following description is taken in conjunction with the accompanying drawings, in which:

FIG. 1 is a view of a general layout of apparatus including shielding components for the production of thermoplastic filamentary material in accordance with the principles of the present invention;

FIG. 2 is an enlarged side elevational view partly in cross section of a glass feeder and associated shield construction shown in FIG. 1;

FIG. 3 is an enlarged cross-sectional view of a pair of feeder tips with cone shields;

FIG. 4 is an enlarged side elevational view of a fin shield member emodying the teachings of this invention;

FIG. 5 is an enlarged view of an alternative embodiment of a fin shield member embodying the teachings of this invention;

FIG. 6 is an enlarged side elevational view of yet another embodiment of a fin shield member illustrative to the teachings of this invention;

Figure 7:
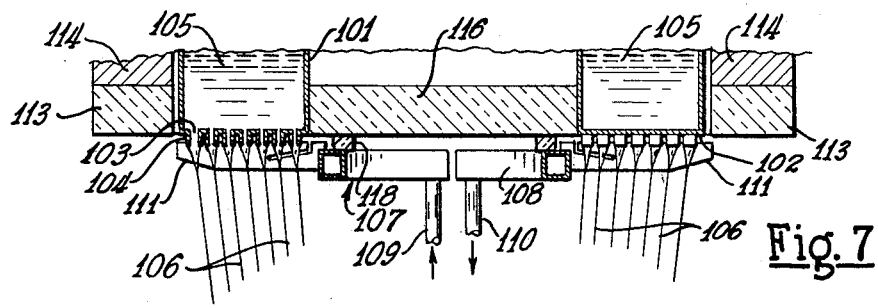
FIG. 7 is an elevational view in cross section of an annular feeder and associated shield unit illustrating another arrangement of the invention.

Referring now to the drawings, FIG. 1 illustrates a refractory furnace 10 for reducing a body of glass to a molten condition having a bushing or feeder 11 associated therewith from which a plurality of streams of glass are emitted from orifices in the feeder for attenuation into fibers 16. The fibers are gathered into a strand by drawing them over a gathering member 17 while a sizing or other coating is applied to the fibers by roll type applicator 18 which supplies a coating to each filament above the point of collection at the gathering member 17. The strand formed of the gathered fibers is packaged by winder 20 which collects the strand on a tube 22 mounted on a rotating collect 23 and traversed by a suitable traversing device such as a spiral wire traverse 21. The winder provides the force of attenuation for the fibers by reason of rotation of the collet which develops tension in each fiber to withdraw it from the molten glass flowing from the feeder.

The shield unit 26 of the present invention provides a plurality of heat removing members in the form of blade-like fins 28 each extending across the bottom of the feeder between rows of feeder tips 14, while each adjacent pair of such fin members has one or two rows of tips aligned therebetween. The orientation of blade-like fins 28 across the under part of the feeder, with feeder tips aligned therebetween may be seen more clearly in FIGS. 2 and 3 which illustrate that the tips 14 and the cones 12 emitted therefrom are, in effect, divided into crosswise rows. The fins 28 extend from a longitudinal header 29 disposed laterally with respect to the feeder structure. Cool water or other coolant is supplied and removed from the header 29 by suitable means (not shown). Water may be fed to one end of the header bar and flow through a hollow channel 25 passing longitudinally through the bar and be emitted from the opposite outlet end at a somewhat higher temperature since upon passage through the header heat is absorbed from the fins. The water can be passed through the channel 25 at a controlled rate of flow and at temperatures predetermined to establish desired temperature differentials between the fins and the glass emitted from the feeder tips.

The height of the fins 28 is preferred to be such that when in operating position, the upper edge of each is at a level slightly above the bottom of the tips with which it is associated while the bottom edge extends downwardly to the level of the apex of the cones emitted from the tip orifices for reasons to be explained hereinafter. By way of example, the upper edge of the fins may be about 1/32 inch above the bottom edges of the tips of the feeders, but not in contact with the under surface of the feeder. With such positioning of the upper edge of the fins, their height to provide full length shielding of the cones in some instances need only be in the order of 3/8 inch.

Installation and mounting means for the shielding unit in proper association with the feeder are not shown and reference is herewith made to the hereinbefore-mentioned patents for suitable positioning and mounting means for use with this invention.

FIG. 3 is an enlarged view of two feeder tips of a pair of adjacent rows of tips 14 illustrating the physical relationship of cone shields thereto on opposite sides of cones of glass 12 emitted from the tips. Although it has been found that cone shields operate satisfactorily when the rows of tips are divided into single rows such as by cone shields 28, it will be readily understood that the corresponding effects can also be obtained by dividing the tips and cones into pairs of rows with a shield disposed immediately adjacent one side of each tip.

In operation the cone shield stabilizes the cones from which the glass fibers are attenuated in a dual sense, namely; (1) by controlling absorption of heat from the glass on emission from the feeder tip and thereby to impart a viscosity to the glass which promotes stability thereto in its fiberization range, and (2) by reducing the disrupting erratic effects of air eddies about the cone as may be caused by both thermal differential conditions and motions of the glass.

The exact mechanics by which the glass is withdrawn at high speed from a feeder tip is difficult to analyze from a theoretical standpoint because the cone of hot glass is in a region of high temperature gradients and, accordingly, a region where conditions are such that rapid variation of viscosity can readily occur. Thermocouple tests in the region of unshielded cones have indicated almost continuous temperature variations in the order of 300° F. and 400° F. within extremely short time intervals. As indicated above, tests have also indicated that there may be a range of up to 250° F. or more from one end of a fin shield, of the type disclosed in the prior art patents mentioned above, to the other end. Observations also indicate that heat losses from the cone are effected by way of radiation as well as by convection. It is believed that most of the radiation losses occur in the region immediately below the feeder tip, in other words, the base of the cone where the glass has its brightest glow and that as it moves downward toward the apex of the cone, more and more losses occur by convection. Accordingly, when cool cone shields are placed adjacent the cones, heat transfer thereto is by way of radiation as well as convection. Thus, this invention is directed to attaining a more uniform temperature along the upper edge of the fins which are disposed more closely adjacent the greatest radiation transfer areas and, contributing more toward the establishment of a viscosity range which may effect the uniformity of diameters of fibers being drawn.

The material of the shield is chosen for its thermoconductivity and emissivity to promote efficient absorption and dissipation of the heat given off by the cones. Examples of metals among those which can perform satisfactorily in this respect are copper, platinum, silver, aluminum, Monel, and nickel as well as alloys of such metals. In this respect it is desirable to have the infrared radiations absorbed and not simply reflected by the material, which makes high emissivity of the material an important factor in its selection. Added to this, the thermoconductivity of the material determines the rate at which heat may be transferred to the water-cooled header.

Aside from their function in absorbing heat from the glass the cone shields also separate or actuate the cones for environmental control and prevent broad sweeping gusts of air from freely flowing about the region of the cones. Thus, erratic variations in temperature caused by such gusts or drafts are restrained, while, in addition the eddies created by sweeping of air past the cones are practically eliminated. Furthermore, flow of air which may be caused by the temperature differential between forming cones is reduced by separation of the rows of the cones from each other, thus also minimizing the complexity offered by their thermal interreaction. Further, in this regard, the height of the shields is preferably such that they extend down to the virtual limits of the cone. Although this invention is directed to the establishment of substantially equal heat resistance conduction paths it is advantageous to form the shield to perform the baffling effects described herein. Therefore, it is preferred that the height of the shields be such that they extend from a slight distance from the bottom of the tips from which the cones are emitted downwardly alongside of the cones to a level coinciding with the tip of the effective length of the cone. The term cone as herein used designates the shape assumed by a stream of molten glass in the zone in immediate proximity to the outlet of an orifice from which it emerges and is attenuated. In a mathematical sense the shape assumed might be more accurately termed a tractrix. The effective length of the cone as used is defined as that length of the emerging glass susceptible to controlled heat loss or the length of the stream in which heat loss from the material substantially affects the final diameter of the filament. Test observations have revealed that this length corresponds practically to the visual length of the cone terminating with the virtual apex. It is in this portion that the glass flows most freely while the glass beyond the virtual apex of the cone where the final fiber diameter is closely approached is less susceptible to instability and to being affected by shielding.

If the shields are extended too high above the level of the bottom of the tips they proximate joinder with the bottom of the feeder and thereby act undesirable as radiating fins of heat of the feeder, making it more difficult to attain the uniform temperatures desired. Furthermore, the top of the shields should be above the level of the bottom of the tips otherwise the highest temperature portion of the cones would go unshielded. Radiation absorption would thus be reduced and drafts of air would have free access to the critical fluid cone bases to cause considerable reduction in efficiency.

The cone shields should also be sufficiently long to prevent drafts from having direct access to the portions of the cones near the apex, but not so long as to cause the extreme speed of the fiber surfaces which would otherwise exist within the boundaries at the bottom of the shields to promote a pumping of the cone. The latter appears to occur partly by reason of air being drawn into the shield boundaries from the above due to the frictional relationship between the high speeds of surrounded fiber portions and partly because, with long shields surrounding such high velocity surfaces, air is rapidly withdrawn from the surrounded space at the bottom of the shields to cause the combination to function in an aspirator-like fashion. In another sense, the shields in determining the establishment of air flow conditions may be looked upon as baffle or damper members.

In fiberizing glass three characteristics of the glass should be considered because of their importance in determining operating conditions. One such factor is the slope of the curve of the viscosity-temperature characteristic of the glass in the fiberization range and above. If the slope of this curve is relatively steep, the temperature range for forming fibers is critically narrowed and difficult to establish in a short time interval within which each portion of the fiber is formed. Cone shields utilized in the prior art imparted to the glass this temperature range in the forming zone since the portion of the path in which the temperature change occurs is controllable influenced by the shield. It may be seen that by providing a more uniform temperature withdrawal means along an individual shield that this temperature range may be more definitely controlled.

A second factor which must be considered in effecting fiberization of glass is the liquidus temperature of the glass. If the liquidus temperature is high, then the glass must be raised in temperature to a point where its viscosity is critically near the border line or outside of the viscosity range within which fiberization can be effected. Under such conditions the cone shields can be used to cool the glass to a fiberizable viscosity on emission from the tips even though the temperature and fluidity of the glass in the main body is much beyond the fiberization range. Without cone shields, the glass on emission from the tips does not cool at a sufficient rate to permit establishment of a continuous pull from a low viscosity fluid. In other words, the surface tension of the highly fluid glass would cause a beading at the tips and possibly flood the feeder thereby preventing continuous attenuation into a fiber. By utilizing the uniform heat withdrawal means of this invention there is prevented this condition occurring when the temperature range along the shield member is such that the glass is not cooled at its efficient rate at one or more of the cones.

A third important characteristic in considering fiberization of the glass is the rate of devitrification of the glass. If the rate of devitrification is high and the molten glass is cooled too slowly the glass passes through its temperature of devitrification slowly, and may undesirably freeze in a crystalline phase. By use of cone shields, however, glasses having high rates of devitrification may be chilled more rapidly on emission from the feeder tips and can be solidified before even partial devitrification can occur. Therefore, the use of a uniform heat withdrawal means as described in this invention prevents this problem from arising when the range of temperatures along the fin-like member may cause one or more of the cones of the row to have a rate of devitrification which is too high.

Referring to FIG. 4 there is illustrated an enlarged view of a fin-like member 28 affixed to a fluid cooling means or header 29 which embodies the teachings of this invention. In this example, let us assume that the fin member 28 is disposed adjacent six cones in a row. In a prior art shield member the range of temperatures along such a fin member may be, for example, 275° F. at a position adjacent the header to 564° F. at the opposite end of the fin member. According to the discussion hereinbefore it is thus desirable to reduce the range of temperatures across the fin member to improve the environmental control at each cone or fiber-forming position. Path lengths for temperature control and heat flow are analogous to electron flow in electrical resistance. Therefore, the fin member 28 has been given a configuration in which path lengths for the temperature flow are substantially equalized thus equalizing the temperatures at the upper portion of the fin member 28. This is accomplished in the embodiment illustrated in FIG. 4 by forming a downwardly extending vertical slot means 30 adjacent the fluid cooling means and a downwardly and diagonally extending slot means 31 beginning at the bottom of the slot 30 and extending away from the header means 29. It may thus be seen that heat resistance path lengths of the paths 32 have been substantially equalized. This results in substantially uniform temperatures at each of the six positions along the upper edge of the fin 28 which are adjacent the cone or fiber-forming areas. The heat resistance medium in the slots 30, 31 in this embodiment is air. However, it should be noted that the slot means 30 and 31 may be filled with material with a low coefficient of thermoconductivity with respect to the high thermoconductivity of the remainder of the member 28. An example of such a material that would meet the temperature ranges involved would be stainless steel. If the rows of tips are very closely spaced it is advantageous to fill the slot means 30 and 31 with a material having a relatively low coefficient of thermoconductivity since in initiating the forming operations drops or beads of glass may tend to lodge in the slot means 30 and 31.

Referring to FIG. 5 there is illustrated a fin-like member 40 which may have a substantially parabolic configuration to equalize heat resistance conduction paths toward the apex 41 of the parabolic configuration. A heat-transfer conductor member 42 is shown connecting the apex 41 of the parabolic member 40 to provide heat paths for the heat conducted to the apex of the parabola to the header member 29.

Referring to FIG. 6 there is shown a still further embodiment of the teachings of this invention in which a fin member 50 may be connected between two fluid cooled or heat removal means 29a and 29b. Vertical slot means 30a and 30b and diagonal slot means 31a and 31b are formed in accordance with the teachings of the embodiment illustrated in FIG. 4 and are operative to equalize the heat resistance paths to the two feeders 29a and 29b. By providing a greater capacity for heat removal with the use of two headers it would be possible to more sharply reduce the temperature of the glass as it flows from the feeder to a desired viscosity range.

Figure 8:
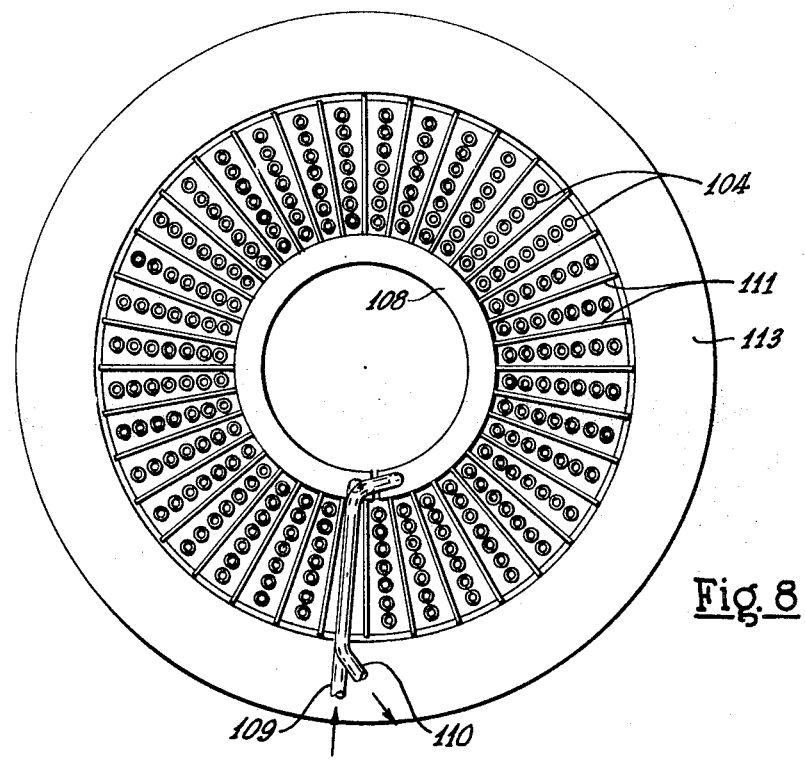
FIG. 8 is a bottom plan view of the feeder and shield unit of FIG. 7.

FIGS. 7 and 8 illustrate another arrangement by which fin-type shield members of this invention can be utilized with a circular feeder. In this instance the feeder 102 is an annular feeder having fin members extending radially from an associated annular manifold or header. More specifically FIG. 7 illustrates in cross section such a feeder associated with a container for molten glass shown in part having an outer cylindrical wall 100 and an inner cylindrical wall 101 between which the horizontal orifice plate or feeder 102 is provided in the form of an annular ring. The feeder contains a plurality of orifices 103 in projecting tips 104 through which the molten material 105 positioned upon the feeder flows. The container for the molten glass is enclosed within a heat-insulating wall provided by the annular wall members 113 and 114, the latter of which is shown in part. A disc 116 of heat-insulating material is positioned within the inner wall 101 of the unit and is disclosed generally above the header 108 for the shield unit 107.

The unit 107 in general comprises the annular header 108 which is hollow to permit passage of coolant therethrough supplied through an inlet conduit 109 and removed by way of an outlet conduit 110. Fins 111 comprising blade-like members extend radially outwardly from the header and across the underside of the feeder portions with which they are associated between the radially aligned rows of tips 104. The entire shield unit is supported in spaced relation from the disc 116 by way of refractory portions 118 or other suitable fastening means, with the fins 111 extending between the tips 104 but spaced from contact with the under surface of the feeder.

FIG. 8 shows the radially aligned orientation of the orifice tips 104 on the underside of the feeder 102. The radial rows of tips also form part of six circumferentially aligned rows, but the fin shield members 111 extending from the header 108 divide the circumferential rows into grooves each comprising one or two radially oriented rows of tips. The tips 104 are also arranged so as to provide a gap in regular spacing between the glass streams 106 emitted therefrom to permit passage from the inlet and outlet conduits 109 and 110, respectively, to the exterior of the cylinder generally defined by the spaced streams.

It will be recognized that the header 108 may be divided into two or more separate headers each having their own inlet and outlet conduits if desired. The fins 111 can also be provided with an outer annular header in addition to the inner header 108 and arranged so that each acts to cool fins extending between them. It is preferred, however, that the fins be arranged in generally radial relation to facilitate visual inspection of the tips and glass emitted from the orifices therefrom during operation of the fiber-forming unit. With concentric inner and outer annular headers, the shield members may be tubular and one of the headers arranged to supply coolant to be passed therethrough while the other acts as an outlet for the coolant.

While the fins 111 of FIGS. 7 and 8 have been shown to have the same configuration as that illustrated in an enlarged view in FIG. 4 to attain the uniform temperatures along the fin shield member, it should be recognized that there are other embodiments not shown herein that may also be utilized for attaining the desired uniformity. Although slots formed in, holes bored in or other material removing or substitution may be utilized to attain the uniformity it should be noted that the uniformity desired may be achieved by varying the thickness, height, and/or combinations of the two along and through the fin members to achieve the desired resistance paths. The embodiments disclosed hereinbefore have been based primarily upon fin members having a uniform thickness throughout their length in order to facilitate fabrication of the fin members. However, in an annular feeder, where the spacing of the rows of tips varies between the innermost tips and the outermost tips a fin member which is formed by varying thickness and/or height may be particularly advantageous in that in order to reduce the heat resistance from an outermost tip of a fin member the thickness would be larger than that thickness adjacent the header or other heat removal means.

Figure 9:
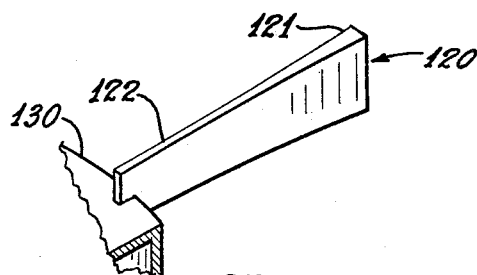
FIG. 9 is an enlarged view of an embodiment of the teachings of this invention which is particularly suitable for use with annular feeders.

Referring to FIG. 9 there is shown a fin-like member 120 which illustrates that the outer end 121 may be thicker than the inner or header end 122 adjacent a header 130. The height of the fin from end to end may also be varied to control the withdrawal of heat uniformly. Since more space is provided between the rows of tips at the outer ends it is obvious that such configurations as illustrated in FIG. 9 would more readily be workable with annular feeders with less danger of accidental bumping the fin members against the tips when installing, cleaning etc.

Therefore, while I have shown certain particular embodiments of my invention, it will, of course, be understood that I do not wish to be limited thereto, since many modifications may be made and I contemplate by the disclosure herein to cover all such modifications as fall within the true spirit and scope of my invention.

I claim:

1. Apparatus for producing filaments of thermoplastic material comprising a feeder having orifices issuing molten streams of such material, means for attenuating said streams into fine filaments, environental control means in combination with said feeder comprising heat sink means and a series of fin-like members disposed in heat-transfer relationship with said sink, each member being oriented transverse to and in adjacent heat-transfer relationship with the paths of at least two of said streams without touching said streams, each member having a configuration which defines substantially equal heat conduction resistance paths from maximum temperature areas of said members adjacent said streas to said heat sink means to establish a substantially uniform temperature along each member.

2. Apparatus as defined in claim 1 in which said fin-like member has slot means formed therein to create heat conduction resistance areas thereby defining heat conduction paths to said heat sink means.

3. Apparatus as defined in claim 2 in which said fin-like member has material in said slot means with a low coefficient of thermal conductivity with respect to the thermal conductivity of the remainder of the member.

4. Apparatus as defined in claim 1 in which said fin-like member has a substantially parabolic configuration and heat-transfer means connecting an apex of said parabolic member to said heat sink means.

5. Apparatus as defined in claim 1 in which said fin-like member is formed with a thickness that increases from one end adjacent said heat sink means to the other end.

6. Apparatus as defined in claim 1 in which said heat sink means comprises at least two separate heat sinks disposed in heat-transfer relationship with opposite ends of at least one fin-like member.

7. Apparatus as defined in claim 1 in which said feeder is generally circular in shape with orifices aligned in radial rows and said fin-like members are radially oriented in their transverse positions.

8. Apparatus for producing glass filaments comprising a feeder for feeding molten glass having projecting tips extending from an under surface thereof, said tips being aligned in rows and each having an oirifice provided therein from which a stream of glass is emitted, means for attenuating the streams to fine filaments, said attenuating means acting on said streams in such a way as to impart in general a conical shape to each extending from a base at its respective orifice to an apex from which its respective filament is withdrawn, environmental control means in combination with said feeder but out of contact therewith comprising thin longitudinal fin members arranged in side-by-side parallel relationship and aligned so that each extends in spaced relation from said feeder between a pair of rows of cones emerging from said tips with a maximum of two rows of cones residing between each pair of such members, and fluid cooling means to which each of said fins is affixed for support and conductive removal of heat from said fins, each member having a configuration which defines substantially equal heat conduction resistance paths from maximum temperature areas adjacent said cones to said fluid cooling means to establish a substantially uniform temperature along each member.

9. Apparatus as defined in claim 8 in which said fin members have slot means formed therein to create heat resistance areas thereby defining heat conduction paths to said fluid cooling means.

10. Apparatus as defined in claim 9 in which said fin members have material in said slot means with a low coefficient of thermal conductivity with respect to the thermal conductivity of the remainder of each member.

11. Apparatus as defined in claim 8 in which said fin members have a substantially parabolic configuration with an extension connecting the apex of a parabolic member with said fluid cooling means.

12. Apparatus as defined in claim 8 in which said fin members are formed with a thickness that increases from one end adjacent said fluid cooling means to the other end.

13. Apparatus as defined in claim 8 in which said fluid cooling means comprise at least two fluid manifolds disposed in heat-transfer relationship with opposite ends of said fin members.

14. Apparatus for producing filaments of thermoplastic material comprising a feeder having orifices issuing molten streams of such material, means for attenuating said streams into filaments, and environmental control means in combination with said feeder including heat removal means and heat control members in heat-transfer relationship therewith and also in heat-transfer relationship with said streams adjacent the paths thereof, each member having a configuration which defines heat conduction paths extending from maximum temperature areas of said members adjacent said streams to said heat removal means, each path of each member being formed with a predetermined resistance to heat conduction to selectively establish the amount of heat conducted along that path with respect to the amount of heat conducted by other paths to provide a uniform temperature along each member adjacent said streams.

References Cited

UNITED STATES PATENTS

| | | | |
|---|---|---|---|
| 3,150,946 | 9/1964 | Russell | 65—2 |
| 3,155,476 | 11/1964 | Drummond | 65—12 |
| 3,217,793 | 11/1965 | Coe | 165—185 |
| 3,251,665 | 5/1966 | Bour | 65—2 |

S. LEON BASHORE, Primary Examiner

R. L. LINDSAY, Jr., Assistant Examiner

U.S. Cl. X.R.

65—2, 355; 165—183, 185